Patented Apr. 21, 1942

2,280,236

UNITED STATES PATENT OFFICE 2,280,236

COMPOUNDS OF THE CYCLOPENTANOPOLY-HYDROPHENANTHRENE SERIES AND PROCESS OF PRODUCING THE SAME

Hans Herloff Inhoffen, Berlin-Wilmersdorf, Willy Logemann, Berlin-Charlottenburg, and Hans Dannenbaum, Falkenhain-Finkenkrug, near Berlin, Germany, assignors to Schering Corporation, Bloomfield, N. J., a corporation of New Jersey No Drawing. Application May 10, 1939, Serial No. 272,756. In Germany May 13, 1938

16 Claims. (Cl. 260—397.4)

This invention relates to the manufacture of ketones of the cyclopentano-polyhydrophenanthrene series in which a keto group is situated in a side chain, in particular on the carbon atom 20, and their derivatives.

In accordance with the present invention it is possible to add on to cyclopentano-polyhydrophenanthrene compounds which contain an ethinyl group in the molecule, hydroxyl-containing compounds as for example water, alcohols, organic acids and the like. By this means, according to the nature of the agent employed for the addition reaction, the ketones are obtained directly, or their inorganic or organic enol derivatives, as for example enol esters, enol ethers, enol halides or also ketone acetals and the like compounds which can be converted by hydrolysis into the ketones.

As starting materials are employed ethinyl compounds of the cyclopentano-polyhydrophenanthrene series as are obtained for example according to British Specifications Nos. 467,790, 486,322 and 468,123, which can be saturated or unsaturated in the ring system, in so far as they contain at least one ethinyl group: —C≡CR in which R indicates hydrogen or any suitable substituted or unsubstituted hydrocarbon residue as far example alkyl or aryl.

This ethinyl group can be attached to any suitable position in the ring system, and on the carbon atom attached to an ethinyl group, a hydroxyl group or a hydrogen atom can be attached.

Of particular importance are however those compounds in which the said group is attached to the carbon atom 17.

As starting materials come into consideration both the ethinyl compounds of the sterols, bile acids and the like and also those of the sexual hormones, for example of the androstane, pregnane and oestrane series. They can be substituted in the molecule in any manner for example by hydroxyl groups, in particular on the carbon atoms 3 and 17. As starting materials which are suitable for the process may be mentioned for example:

17-ethinyl-androstendiol
17-ethinyl-testosterone
17-ethinyl-androstadienone
17-ethinyl-oestradiol
17-ethinyl-dihydroequilin
17-ethinyl-dihydroequilenin
17-ethinyl-androstandiol
2-ethinyl-cholestanone-3
16-ethinyl-androstendiol The process according to the invention can be carried out in the manner known per se (compare for example Houben Weyl, Die Methoden der organischen Chemie, 1922, vol. 2, pages 815–817). Thus the attachment of water can be carried out for example by the action of mineral acids and in particular of sulphuric acid, if desired with the addition of catalysts such as mercury compounds or other heavy metal salts, as for example ferric or ferrous or manganese compounds.

Particularly suitable has proved the application of mercury salts as for example mercury acetate or mercury oxide in the presence of boron trifluoride or its addition products as for example boron trifluoride etherate.

Also the application of organic acids and in particular fatty acids as for example formic acid, if desired with the addition of catalysts, capable of adding water on unsaturated bonds, may in some cases be of advantage. In this case a tertiary hydroxyl group present in the molecule may be split off at the same time.

In the application of mono or polyhydric alcohols such as methanol, ethanol, glycol and so on, as representatives of hydroxyl-containing compounds which come into consideration for attachment to the ethinyl compounds, boron fluoride, mercury oxide, alkali alcoholates and the like can likewise be employed as catalysts.

The acetals thereby obtained can be converted in known manner, for example by acid splitting, into the ketones; for this purpose inorganic acids such as sulphuric acid can be employed with advantage in a suitable solvent, as for example alcohols. There can also be employed however for this purpose organic acids (compare for example Houben-Weyl, Die Methoden der organischen Chemie, 1923, vol. 3, page 161 et seq.).

Hydroxyl groups present in the molecule of the starting material can if desired be protected in suitable manner for example by esterification, etherification and the like, and in general by conversion into groups from which the hydroxyl group can be reformed.

Likewise also reactive keto groups in the molecule can be protected by conversion into enol esters, enol ethers and the like.

The reaction sequence may be illustrated by the following formulae, in which R indicates hydrogen or an organic residue, as for example a hydrocarbon residue:

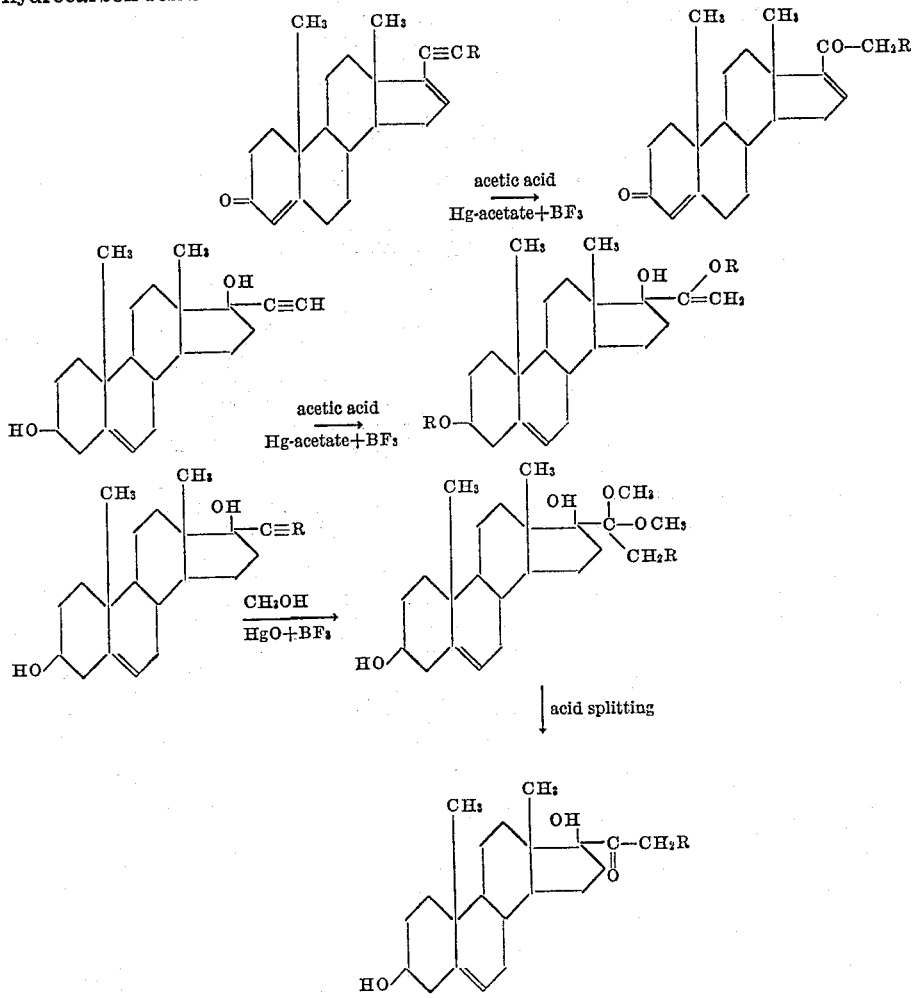

The products obtained in this manner are valuable intermediate products for the manufacture of physiologically active substance or are themselves physiologically active.

The following examples illustrate the invention.

*Example 1*

1.8 grams of ethinyl androstendiol are brought into solution with 20 grams of boiling absolute ethyl alcohol and then treated with 150 grams of a hot catalyst solution prepared according to the directions given below. Immediately a grey dust is precipitated which consists of metallic mercury. The whole is heated under reflux for 2½ hours, the alcohol then distilled off in vacuum at the lowest possible bath temperature to a volume of about 70 ccs. and after the addition of 630 ccs. of water thoroughly extracted with ether. The ether thoroughly washed with water and dried is carefully distilled off and the residue dissolved in 30 ccs. of absolute alcohol, treated with 3 ccs. of concentrated aqueous hydrochloric acid and boiled for 1 hour in a $CO_2$ atmosphere under reflux. Thereupon the whole is poured into 300 ccs. of water, thoroughly extracted with ether and the ether washed with bicarbonate solution and distilled water. The ether dried with sodium sulphate leaves 1.97 gram of an oily substance in which the ketones formed are contained. These are isolated in such a manner that they are separated in known manner by reaction with Girard-T-reagent (-dimethylamino-acetic acid hydrazide chloromethylate) from simultaneously formed non-ketone substances, acetylated in known manner with acetic anhydride-pyridine and then obtained in the form of a brown crystallising oil. The crude ketones can be converted by chromatographic analysis into colourless crystallising substances which are obtained in good yield and constitute the acetates of the ketones formed. Also the non-ketones formed can be converted by the same treatment into colourless crystallising substances (yield of ketone acetates 0.96 gram, of acetylated non-ketones 0.93 gram).

*Catalyst solution.*—180 grams of absolute ethyl alcohol are boiled under reflux for 4 hours with 12 grams of dry yellow HgO and 5.6 ccs. of boron trifluoride etherate with the exclusion of moisture. The whole is allowed to cool, filtered with suction from grey coloured HgO and the clear filtrate kept in a dark bottle.

Example 2

A solution of 0.5 gram of 17-ethinyl-$\Delta_{4.5:16.17}$-androstadienone-3 in 50 ccs. of 70% acetic acid is heated with the addition of 0.5 gram of concentrated sulphuric acid and 0.5 gram of mercury sulphate for 4 hours. After dilution with water the organic material is taken up in ether and the ethereal solution washed with sodium carbonte solution and water. The product obtained after the evaporation of the ether is for the purpose of further purification distilled in high vacuum, whereby the $\Delta_{4.5:16.17}$-pregnadiendione-3.20 is obtained as a light oil which can be still further purified.

Example 3

To a solution of 0.5 gram of $\Delta_{5.6}$-17-ethinyl-androstendiol-3.17 in a mixture of 50 ccs. of glacial acetic acid and 5 ccs. of acetic anhydride are added 5 grams of mercury acetate and 5 drops of boron trifluoride etherate. After 124 hours' standing the whole is diluted with water, the separated product taken up in ether and the residue obtained after washing with dilute hydrochloric acid, sodium carbonate solution and water and evaporation of the ether, boiled with 50 ccs. of 5% methyl alcoholic aqueous potassium carbonate solution for half an hour. The solution is poured into water, the saponification product taken up in ether and the ether solution washed neutral; at the separating layer there has already separated a part of the difficultly soluble reaction product. The ether solution together with the material crystallised out is concentrated and cooled. The crystallisate is filtered with suction and recrystallised from methanol-chloroform. The $\Delta_{5.6}$-pregnendiol-3.17-one-20 is obtained in beautiful crystals of melting point 267° C.; yield 0.1 gram. Instead of mercury acetate also mercury oxide can be employed.

Example 4

To a solution of 0.5 gram of $\Delta_{4,5}$-17-ethinyl-androstenol-17-one-3 in a mixture of 150 ccs. of glacial acetic acid and 15 ccs. of acetic anhydride are added 3 grams of mercury acetate and 2 ccs. of boron trifluoride etherate, whereby rapid red coloration takes place. After 24 hours the whole is diluted with water, the product obtained taken up in ether and the residue obtained after washing and evaporation of the ether purified by a high vacuum distillation at 190–200° C. under 0.0004 mm. pressure and fractional chromatographic adsorption. The 20-acetate of $\Delta_{4.5:20.21}$-pregnadiendiol-17.20-one-3 is obtained as a light oil which can be further purified.

Example 5

To a solution of 0.5 gram of $\Delta_{5.6:16.17}$-17-ethinyl-androstadien-ol-3 in a mixture of 50 ccs. of glacial acetic acid and 5 ccs. of acetic anhydride are added 0.5 gram of mercury oxide and 5 drops of boron trifluoride etherate. After 124 hours' shaking the whole is diluted with water, the separated product taken up in ether and the residue obtained after washing with dilute hydrochloric acid, sodium carbonate solution and water and evaporation of the ether, boiled with a solution of 1 gram of caustic potash in 10 ccs. of methanol for 2 hours under reflux. The whole is diluted with water, the saponification product taken up in ether and after washing the ether evaporated. The oily residue is purified by high vacuum distillation at 180° C. and 0.0003 mm. pressure and fractional chromatographic adsorption. There is obtained the $\Delta_{5.6:16.17}$-pregnadien-ol-3-one-20.

Example 6

To a solution of 0.5 gram of $\Delta_{4.5:16.17}$-17-ethinyl-androstadien-one-3 in a mixture of 50 ccs. of glacial acetic acid and 5 ccs. of acetic anhydride are added 0.5 gram of mercury oxide and 10 drops of boron trifluoride etherate. After 124 hours' shaking the whole is diluted with water, the separated product taken up in ether and the residue obtained after washing with dilute hydrochloric acid, sodium carbonate solution and water and evaporation of the ether, boiled with a solution of 1 gram of caustic potash in 10 ccs. of methanol for 2 hours under reflux. The saponification product is isolated by dilution and extraction with ether. From the oil obtained, after further purification by high vacuum distillation and fractional chromatographic adsorption, is isolated the $\Delta_{4.5:16.17}$-pregnadien-dione-3.20.

What we claim is:

1. Process for the manufacture of compounds of the cyclopentano-polyhydrophenanthrene series, wherein steroids containing an ethinyl group are subjected to the action of an agent capable of adding on water to the ethinyl group.

2. Process for the manufacture of compounds of the cyclopentano-polyhydrophenanthrene series, in which a steroid containing an ethinyl group is reacted with a hydroxyl-containing compound of the group consisting of water, alcohols and organic acids, in the presence of a catalyst capable of adding water on unsaturated bonds.

3. Process as claimed in claim 2, in which as starting materials members of the group consisting of nuclearly saturated and nuclearly unsaturated steroids are employed which contain one ethinyl group of the formula —C≡CR in which R indicates a member of the class consisting of hydrogen and a hydrocarbon radical.

4. Process as claimed in claim 2, in which as starting materials steroids are employed which contain the side chain

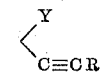

wherein Y indicates a member of the group consisting of hydrogen, hydroxyl and a group convertible with the aid of hydrolysis into a hydroxyl group and R indicates a member of the group consisting of hydrogen and hydrocarbon radicals.

5. Process as claimed in claim 2, in which the ethinyl group in the starting material is attached on the carbon atom 17.

6. Process as claimed in claim 2, in which as compounds containing hydroxyl groups alcohols are employed and the ketone acetals produced are converted into the corresponding ketones by hydrolysis.

7. Process as claimed in claim 2, in which as compounds containing a hydroxyl group alcohols are employed and the ketone acetals produced are converted into the corresponding ketones by means of acids.

8. Process as claimed in claim 2, in which boron trifluoride and acetic anhydride are employed as catalyst.

9. Process as claimed in claim 2, in which as catalyst boron trifluoride, acetic anhydride and mercury compounds capable of adding water onto unsaturated bonds taken from the class consisting of mercury oxide and mercury salts are employed.

10. Process as claimed in claim 2, in which as catalyst mineral acids are employed with the addition of mercury compounds capable of adding water onto unsaturated bonds taken from the class consisting of mercury oxide and mercury salts.

11. Process for the manufacture of compounds of the cyclopentano-polyhydrophenanthrene series, wherein steroids containing an ethinyl group are treated with acid halides with the addition of acid-binding solvents, and the enol halides thereby produced are converted by hydrolysis into the ketones.

12. Process as claimed in claim 11, in which as acid-binding agents tertiary amines are used.

13. Compounds of the cyclopentano-polyhydrophenanthrene series containing at the 17-position the enolic side chain

in which Z indicates a member of the group consisting of halogen, O-alkyl and O-acyl.

14. Compounds of the androstane series containing at the 17-position the enolic side chain

in which Z indicates a member of the group belonging to halogen, O-alkyl and O-acyl.

15. Compounds of the oestrone series containing at the 17-position the enolic side chain

in which Z indicates a member of the group belonging to halogen, O-alkyl and O-acyl.

16. A 3,17-androstendiol containing at the 17 position the enolic side chain

in which Z indicates a member of the group belonging to halogen, O-alkyl and O-acyl.

HANS HERLOFF INHOFFEN.
WILLY LOGEMANN.
HANS DANNENBAUM.